(12) United States Patent
Lee et al.

(10) Patent No.: US 10,555,103 B2
(45) Date of Patent: Feb. 4, 2020

(54) METHOD FOR OUTPUTTING AUDIO SIGNAL USING SCENE ORIENTATION INFORMATION IN AN AUDIO DECODER, AND APPARATUS FOR OUTPUTTING AUDIO SIGNAL USING THE SAME

(71) Applicant: LG ELECTRONICS INC., Seoul (KR)

(72) Inventors: Tung Chin Lee, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 61 days.

(21) Appl. No.: 15/860,934

(22) Filed: Jan. 3, 2018

(65) Prior Publication Data

US 2018/0288553 A1 Oct. 4, 2018

Related U.S. Application Data

(60) Provisional application No. 62/479,323, filed on Mar. 31, 2017.

(51) Int. Cl.
| | |
|---|---|
| *H04S 7/00* | (2006.01) |
| *G06F 3/01* | (2006.01) |
| *H04N 21/439* | (2011.01) |

(52) U.S. Cl.
CPC ............... *H04S 7/30* (2013.01); *G06F 3/011* (2013.01); *H04N 21/439* (2013.01); *H04S 2400/11* (2013.01); *H04S 2420/03* (2013.01)

(58) Field of Classification Search
CPC .... H04S 7/30; H04S 2400/11; H04S 2420/03; G06F 3/011; H04N 21/439; H04N 21/44218; H04N 21/4852; H04N 21/8106; H04N 21/84; H04N 21/85406
USPC ........................................................ 381/310
See application file for complete search history.

(56) References Cited

U.S. PATENT DOCUMENTS

| | | | |
|---|---|---|---|
| 2017/0013388 A1* | 1/2017 | Fueg | H04S 7/301 |
| 2018/0046431 A1* | 2/2018 | Thagadur Shivappa | H04S 7/304 |

* cited by examiner

*Primary Examiner* — Vivian C Chin
*Assistant Examiner* — Douglas J Suthers
(74) *Attorney, Agent, or Firm* — Birch, Stewart, Kolasch & Birch, LLP

(57) ABSTRACT

A method for outputting an audio signal corresponding to scene orientation information is disclosed. The method includes receiving an audio signal interacting with a video, generating a decoded audio signal, object metadata, and scene orientation information through decoding, receiving external control information, and generating modified object metadata suitable for a playback environment by modifying the object metadata based on the received external control information, rendering the decoded audio signal using the modified object metadata, and modifying the rendered audio signal according to the scene orientation information.

10 Claims, 6 Drawing Sheets

FIG. 5

| Syntax | No. of bits | Mnemonics |
|---|---|---|
| mpegh3daExtElementConfig() {    usacExtElementType = escapedValue(4, 8, 16);    usacExtElementConfigLength = escapedValue(4, 8, 16);    if (usacExtElementDefaultLengthPresent) {       usacExtElementDefaultLength = escapedValue(8, 16, 0) + 1;    } else {       usacExtElementDefaultLength = 0;    } | 1 | uimsbf |
|    usacExtElementPayloadFrag; | 1 | uimsbf |
|    switch (usacExtElementType) {    case ID_EXT_ELE_FILL:       /* No configuration element */       break    case ID_EXT_ELE_MPEGS:       SpatialSpecificConfig()       break    case ID_EXT_ELE_SAOC:       SAOCSpecificConfig()       break    case ID_EXT_ELE_AUDIOPREROLL:       /* No configuration element */       break    case ID_EXT_ELE_DRC:       mpegh3daUniDrcConfig()       break    case ID_EXT_ELE_METADATA:       ObjectMetadataConfig()       break    case ID_EXT_ELE_SAOC_3D:       SAOC3DSpecificConfig()       break    case ID_EXT_ELE_HOA:       HOAConfig()       break    case ID_EXT_ELE_FMT_CNVRTR:       /* No configuration element */       break    case ID_EXT_ELE_MCT:       MCTConfig()       break    case ID_EXT_ELE_TCC:       TccConfig()       break    case ID_EXT_ELE_HOA_ENH_LAYER:       HOAEnhConfig()       break    case ID_EXT_ELE_HREP:       HREPConfig(current_signal_group)       break    case ID_EXT_ELE_ENHANCED_OBJ_METADATA:       EnhancedObjectMetadataConfig()    case ID_EXT_ELE_SCENE_ORIENTATION_METADATA:       /* No configuration element */ | | |
|    default: NOTE       while (usacExtElementConfigLength--) {          tmp       }       break    } } | 1 | uimsbf |

FIG. 6

| Syntax | No. of bits | Mnemonics |
|---|---|---|
| Scene Orientation Metadata Frame 0 { | | |
| so_yaw; | 9 | uimsbf |
| so_pitch; | 9 | uimsbf |
| so_roll; | 9 | uimsbf |
| } | | | ly set forth herein.

METHOD FOR OUTPUTTING AUDIO SIGNAL USING SCENE ORIENTATION INFORMATION IN AN AUDIO DECODER, AND APPARATUS FOR OUTPUTTING AUDIO SIGNAL USING THE SAME

Pursuant to 35 U.S.C. § 119(e), this application claims the benefit of U.S. provisional Application No. 62/479,323, filed on Mar. 31, 2017, which is hereby incorporated by reference as if fully set forth herein.

BACKGROUND OF THE INVENTION

Field of the Invention

The present disclosure relates to a method for outputting an audio signal corresponding to a video scene orientation, using scene orientation information, and an apparatus for outputting an audio signal, using the same.

Discussion of the Related Art

Along with the recent development of Information Technology (IT), various smartphones have been developed. Particularly, such a smartphone basically provides audio outputs with various effects. Many techniques have been attempted for more real audio outputs in a Virtual Reality (VR) environment or a Three-Dimensional (3D) audio environment. In this context, MPEG-H has been developed as a new international standard for audio coding. MPEG-H is a new international standardization project seeking to provide an immersive multimedia service using an ultra high-definition large-screen display (e.g., of size 100 or more inches) and an ultra multi-channel audio system (e.g., a 10.2- or 22.2-channel audio system). Particularly, a subgroup called "MPEG-H 3D Audio Adhoc Group (AhG)" has been established and working within the MPEG-H standardization project.

MPEG-H 3D Audio aims to radically improve a legacy 5.1-channel (or 7.1-channel) surround system and provide more real 3D audio. For this purpose, various types of audio signals (audio channels, audio objects, and Higher Order Ambisonics (HOA)) are received and reconfigured adaptively to a given environment. Besides, it is possible to control the position and volume of an object through interaction with a user and preset information selection.

Further, an MPEG-H 3D Audio encoder provides immersive audio to listeners, using a multi-channel speaker system. In addition, the MPEG-H 3D Audio encoder provides a 3D audio effect with a greater sense of reality in a headphone environment. Owing to these characteristics, the MPEG-H 3D Audio encoder is under consideration as a VR audio standard.

However, although a video and an audio are played back together in most content, the video and audio are encoded independently, without mutual interaction in the VR environment. This is a factor that may decrease a user's sense of immersion during use of VR content.

Specifically, since the MPEG-H 3D Audio encoder basically provides a binaural renderer function and also supports a head tracking mode, its utilization is very high in the case of using VR content. However, a binaural renderer just renders a sound image in conjunction with a head tracker, with no regard to video scene switching, which may cause a problem in using VR content. For example, considering a situation where a front direction has been set as a reference axis when a video scene is captured using a 360-degree camera, the video scene is captured with the camera rotated, capturing direction information (i.e., 'scene orientation information') is always provided for video playback. However, since the conventional MPEG-H 3D Audio encoder does not receive scene orientation information, the direction of a sound source is inaccurate and thus is not connected naturally to a video scene during reproduction of VR content including a video and an audio.

The problem will be described in detail with reference to FIGS. 1 and 2.

Referring to FIG. 1, a camera 30 and a microphone (mic.) 21 are installed ahead of a photographer 10. Further, a first sound source (sound source 1) 22 and a second sound source (sound source 2) 23 are positioned respectively in front of the photographer 10 and on a left side of the photographer 10. If a video captured by the user in this environment is viewed, sound source 1 22 is seen on a screen, whereas it is perceived through a played sound source that sound source 1 22 and sound source 2 23 are positioned respectively in front of and on the left side of the user.

However, if a video captured by rotating the capturing direction of the camera 30 by 90 degrees is viewed, it is perceived in a played sound source that sound source 1 22 and sound source 2 23 are in the same directions as before. That is, even though the camera 30 faces ahead of the user (FIG. 1) or a side of the user (FIG. 2) during capturing, the characteristics of signals recorded through a microphone 21 used for the capturing are identical. For example, since an audio is recorded mostly using an omni-directional microphone (e.g., the microphone 21) during video capturing, the audio is not affected by a video scene orientation. However, when information of this recorded sound source is played back along with a video, the sound source is inaccurately provided to a user, as described above.

Even when the user views a video scene of a changed capturing direction using a random access function during viewing a video, the direction of a signal recorded through the microphone 21 is not changed.

That is, a video signal and an audio signal are processed independently without information compatibility. Thus, unless interacting video playback information is received separately during audio play, it is difficult to play back an audio adaptively to a video playback environment.

SUMMARY OF THE INVENTION

Accordingly, an aspect of the present disclosure is to provide a method and apparatus for outputting an audio signal using scene orientation information.

Another aspect of the present disclosure is to provide an MPEG-H Audio decoder using scene orientation information.

Another aspect of the present disclosure is to provide a method for including scene orientation information in an audio signal, for active interaction between a video and an audio.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a method for outputting an audio signal corresponding to scene orientation information includes receiving an audio signal interacting with a video, generating a decoded audio signal, object metadata, and scene orientation information through decoding, receiving external control information, and generating modified object metadata suitable for a playback environment by modifying the object metadata based on the received external control information, rendering the decoded audio signal using the modified object metadata, and modifying the rendered audio signal according to the scene orientation information.

In another aspect of the present disclosure, an apparatus for outputting an audio signal corresponding to scene orientation information includes an audio decoder for receiving an audio signal interacting with a video, and generating a decoded audio signal, object metadata, and scene orientation information, a metadata processor for receiving external control information, and generating modified object metadata suitable for a playback environment by modifying the object metadata based on the received external control information, and a renderer for rendering the decoded audio signal using the modified object metadata. The renderer modifies the rendered audio signal according to the scene orientation information.

The scene orientation information may be information corresponding to capturing direction switching during generation of a video scene interacting with the audio signal.

The scene orientation information may be information corresponding to a random access picture during execution of a random access function for a video scene interacting with the audio signal.

The audio signal may include an indicator indicating inclusion of the scene orientation information.

The scene orientation information may include scene orientation angle information corresponding to x, y, and z axes.

The modified object metadata may include a relative position of an audio object and a gain in a space corresponding to a user location.

The method may further include performing binaural rendering on the rendered audio signal, using a Binaural Room Impulse Response (BRIR) to output the rendered audio signal as a 2-channel surround audio signal.

The apparatus may further include a binaural renderer for performing binaural rendering on the rendered audio signal, using a BRIR to output the rendered audio signal as a 2-channel surround audio signal.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIGS. 5 and 6 are views illustrating exemplary audio syntaxes that provide scene orientation information according to the present disclosure.

DETAILED DESCRIPTION OF THE INVENTION

Figure 1:
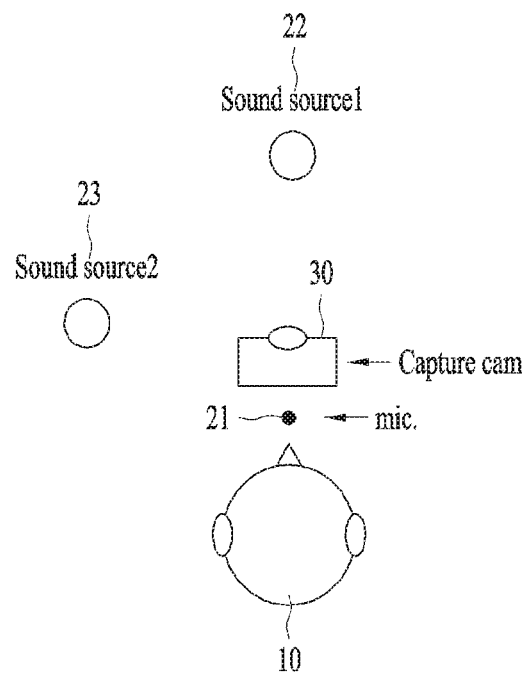
FIGS. 1 and 2 are views referred to for describing the concept of the present disclosure.
Figure 2:
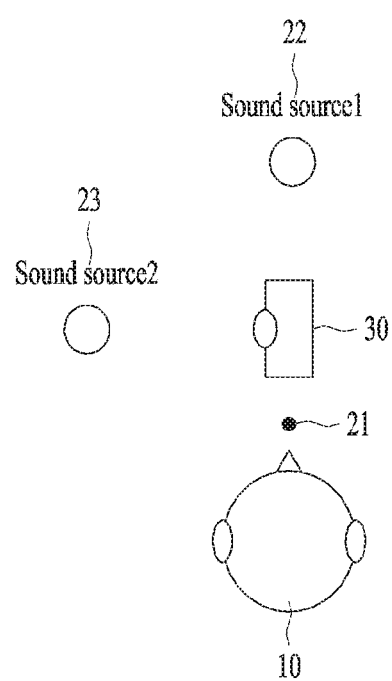

Embodiments disclosed in the present disclosure will be described in detail with reference to the attached drawings. Like reference numerals denote the same or similar components throughout the drawings and a redundant description of the same components will be avoided. The terms with which the names of components are suffixed. 'module', 'unit', and 'means' are assigned or interchangeably used with each other, only in consideration of the readiness of specification writing. The terms do not have any distinguishable meanings or roles. A detailed description of a related known technology will be omitted lest it should obscure the subject matter of embodiments of the present disclosure. Further, the attached drawings are provided to help easy understanding of embodiments disclosed in the present disclosure, not limiting the scope and spirit of the present disclosure. Thus, it is to be understood that the present disclosure covers all modifications, equivalents, and/or alternatives falling within the scope and spirit of the present disclosure.

Figure 3:
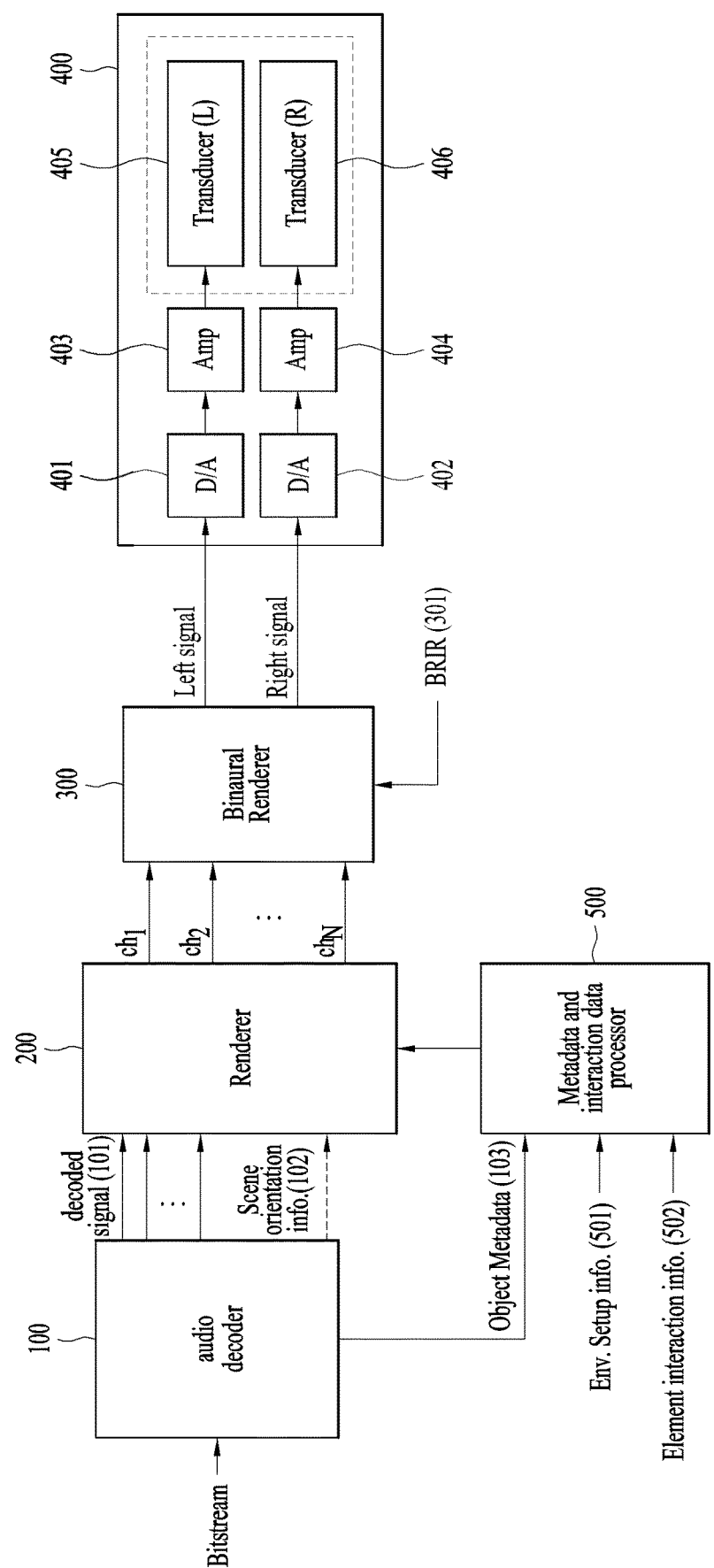
FIG. 3 is a block diagram of an audio output apparatus according to an embodiment of the present disclosure.

FIG. 3 is a block diagram of an audio output apparatus according to an embodiment of the present disclosure.

Referring to FIG. 3, an audio output apparatus according to an embodiment of the present disclosure includes an audio decoder 100, a renderer 200, and a metadata and interaction data processor (hereinafter, referred to simply as a 'metadata processor') 500.

The audio output apparatus of the present disclosure may further include a binaural renderer 300 to generate a surround 2-channel audio using a Binaural Room Impulse Response (BRIR) 301 in an environment requiring 2-channel audio output such as a headphone or an earphone.

Further, the audio output apparatus of the present disclosure may include a 2-channel output device 400. The 2-channel audio output device 400 may be configured to include Digital-to-Analog (D/A) converters 401 and 402 for converting a digital signal to an analog signal, amplifiers 403 and 404 for amplifying the converted analog signal, and transducers 405 and 406 for providing a final audio playback signal to a user, in correspondence with left and right audio channels. One thing to note herein is that the binaural renderer 300 and the 2-channel audio output device 400 may have different configurations according to a use environment.

An audio signal (e.g., an audio bitstream) input to the audio decoder 100 may be received from an encoder (not shown) and configured in an audio compressed file format (.mp3, .aac, or the like). The audio decoder 100 decodes the received audio bitstream in a coded format, and outputs a decoded audio signal 101 and audio metadata (e.g., 'object metadata') 103. Further, the audio decoder 100 extracts scene orientation information 102 included in the audio signal, as described before. A specific configuration example and audio signal syntax structure of the scene orientation information 102 will be described later in detail with reference to FIGS. 5 and 6.

In this context, the audio decoder 100 may be configured as an MPEG-H 3D Audio decoder. An embodiment of configuring the audio decoder 100 as an MPEG-H 3D Audio decoder will be described later in detail with reference to FIG. 7. However, the essential features of the present disclosure are not limited to a specific format of the audio decoder 100.

The decoded audio signal 101 is input to the renderer 200. The renderer 200 may be configured in various manners according to a use environment. The renderer 200 may perform rendering and mixing. According to a use example, the rendering and mixing functions may be executed in separate blocks (e.g., refer to FIG. 7).

The metadata processor 500 receives the object metadata 103 from the audio decoder 100. Further, the metadata processor 500 receives external control information including environmental setup information 501 and element interaction information 502 from the outside. For example, the environmental setup information 501 includes information indicating whether a speaker or a headphone is to be used for audio output and/or information indicating the number and positions of playback speakers. Further, for example, the element interaction information 502 includes user interaction control information. Herein, the environmental setup information 501 and the element interaction information 502 may vary according to audio decoder formats. In this context, if the present disclosure is applied to an MPEG-H 3D Audio decoder, the environmental setup information 501 and the element interaction information 502 may include the following individual pieces of information.

For example, the environmental setup information 501 may include information about a rendering type (information selecting one of loudspeaker rendering and binaural rendering), WIRE output setup information (information indicating whether another output device is to be connected), and local screen size information (information indicating the size of a screen viewed). For example, the element interaction information 502 may include interaction signature information, zoom area information, and user interaction mode information. Even while a sound source is played back, a user may freely input the element interaction information 502, thereby changing the characteristics of the sound source.

Figure 4:
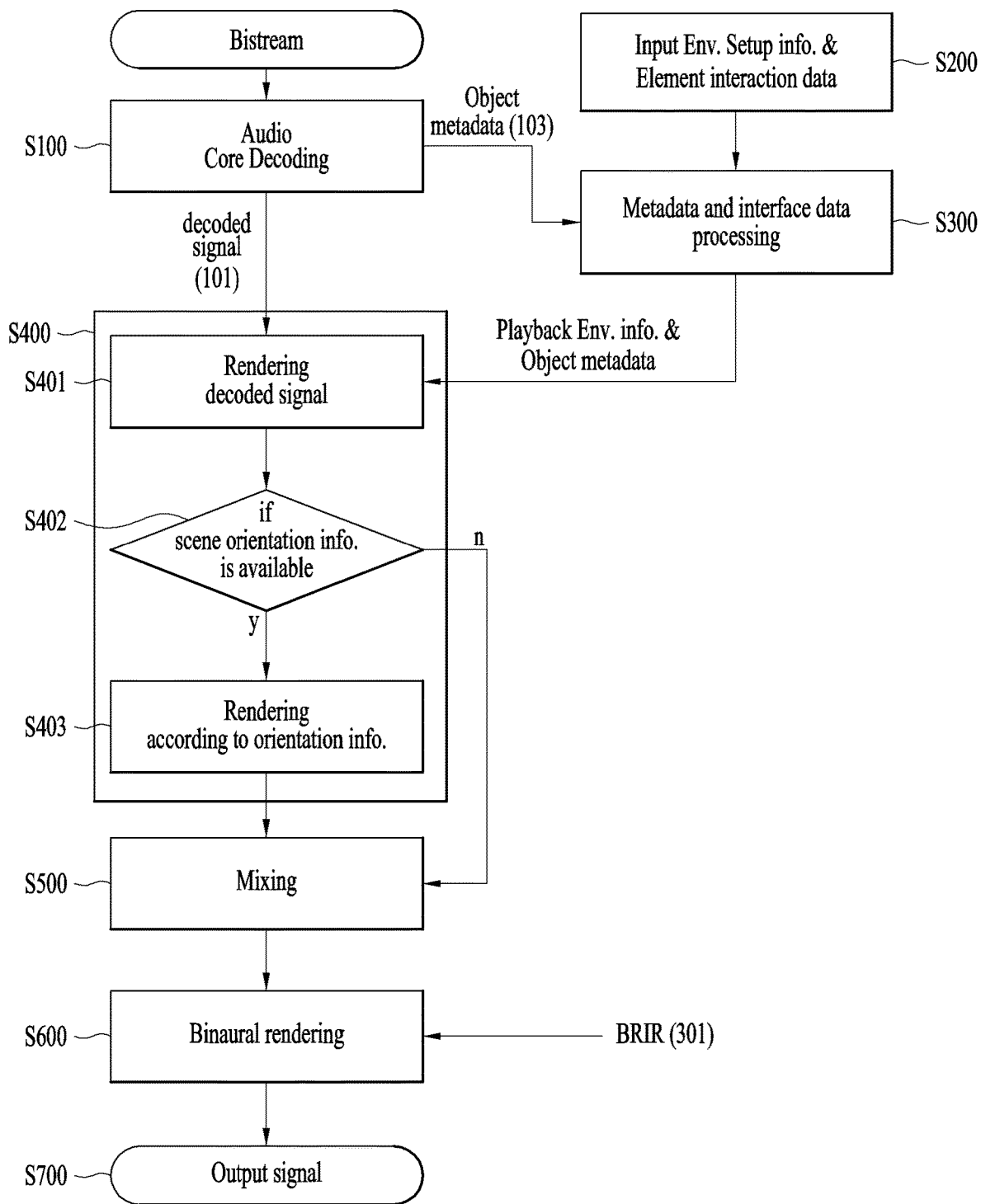
FIG. 4 is a flowchart illustrating an audio output method according to the present disclosure.

FIG. 4 is a flowchart illustrating an audio output method according to the present disclosure.

Referring to FIG. 4, an audio bitstream is received and decoded, and the decoded signal 101 and the object metadata 103 are output (S100).

After the environment setup information 501 and the element interaction information 502 are received (S200), the metadata processor 500 generates playback environment information, and generates modified metadata by mapping the object metadata 103 to the playback environment information (S300).

Steps S400 and S500 are performed by the renderer 200. Steps S400 and S500 include the following specific steps. If it is determined that the decoded signal 101 is an object type, referring to the playback environment information generated in step S300, an object signal is rendered by applying the modified metadata (S401). If the audio bitstream includes scene orientation information ('y' in S402), the rendered signal is modified according to the given scene orientation information and rendered again (S403). Subsequently, a channel signal is reconfigured by mixing all rendered signals (S500). If the audio bitstream does not include scene orientation information or does not include a changed value ('n' in S402), a channel signal is reconfigured by mixing the rendered signal generated in step S401 without modification (S500). The rendering step S400 may be performed using, for example, a conventional Vector Based Amplitude Panning (VBAP) method.

The binaural renderer 300 filters the signal reconfigured in step S500 using the received BRI 301, thus outputting a 2-channel surround audio signal (S600).

Finally, the 2-channel audio signal generated in step S600 is provided to a user through the 2-channel audio output device 400 (S700).

FIGS. 5 and 6 are views illustrating exemplary audio syntaxes that provide scene orientation information according to the present disclosure. The audio syntaxes may be, but not limited to, MPEG-H 3D audio syntaxes, by way of example.

FIG. 5 illustrates, for example, an extension element configuration 700 in an MPEG-H 3D Audio syntax. The scene orientation information related to the present disclosure may be added as an exemplary extension element, as indicated by a block 701 in FIG. 5. The extension element 701 serves as an indicator indicating the presence of the scene orientation information in the Audio syntax. That is, the scene orientation information may be extracted depending on the presence or absence of the indicator 701. The indicator 701 may prevent unnecessary information, thus increasing an audio coding efficiency.

FIG. 6 illustrates a scene orientation metadata frame syntax 800 that provides the scene orientation information by the indicator 701. For example, the scene orientation information may be represented in the unit of (yaw, pitch, roll). That is, in the case where a front is assumed to be a reference direction (0, 0, 0), if a camera captures by rotating at 90 degrees to the left of the reference direction, the scene orientation information may be (0, 90, 0), and if the camera captures at 90 degrees to the front 0 degree, the scene orientation information may be (0, 0, 90).

That is, upon receipt of a specific direction information value ($\alpha, \beta, \theta$) other than (0, 0, 0), as the scene orientation information, the renderer 200 outputs a modified rendered signal by further rendering the rendered signal generated in the afore-described step S401 by the value ($\alpha, \beta, \theta$).

Specifically, the (yaw, pitch, roll) unit of representing the scene orientation information will be described below with reference to the audio syntax of FIG. 6.

A so yaw field 801 defines a z-axis scene orientation angle. The angle $\alpha$ is given as a value between −180 degrees and 180 degrees according to a defined variable by the following equation.

$$\alpha=(\text{so\_yaw}/2^8-1)\cdot 180, \alpha=\min(\max(\alpha,-180),180).$$

A so pitch field 802 defines an x-axis scene orientation angle. The angle $\beta$ is given as a value between −180 degrees and 180 degrees according to a defined variable by the following equation.

$$\beta=(\text{so\_pitch}/2^8-1)\cdot 180, \beta=\min(\max(\beta,-180),180).$$

A so_roll field 803 defines a y-axis scene orientation angle. The angle $\theta$ is given as a value between −180 degrees and 180 degrees according to a defined variable by the following equation.

$$\theta=(\text{so\_roll}/2^8-1)\cdot 180, \theta=\min(\max(\theta,-180),180).$$

Accordingly, the MPEG-H 3D Audio decoder operates using the scene orientation information as follows. First, use of the scene orientation information is announced through an mpegh3da-ExtElementConfig( ) function illustrated in FIG. 5. Then, a SceneOrientationMetadataFrame( ) function of FIG. 6 is invoked in each audio frame, and thus scene orientation information is received. The received scene orientation information, (yaw, pitch, roll) is applied to the rendered signal generated in step S401, and thus a newly rendered signal, that is, a modified rendered signal is output in step S403.

Figure 7:
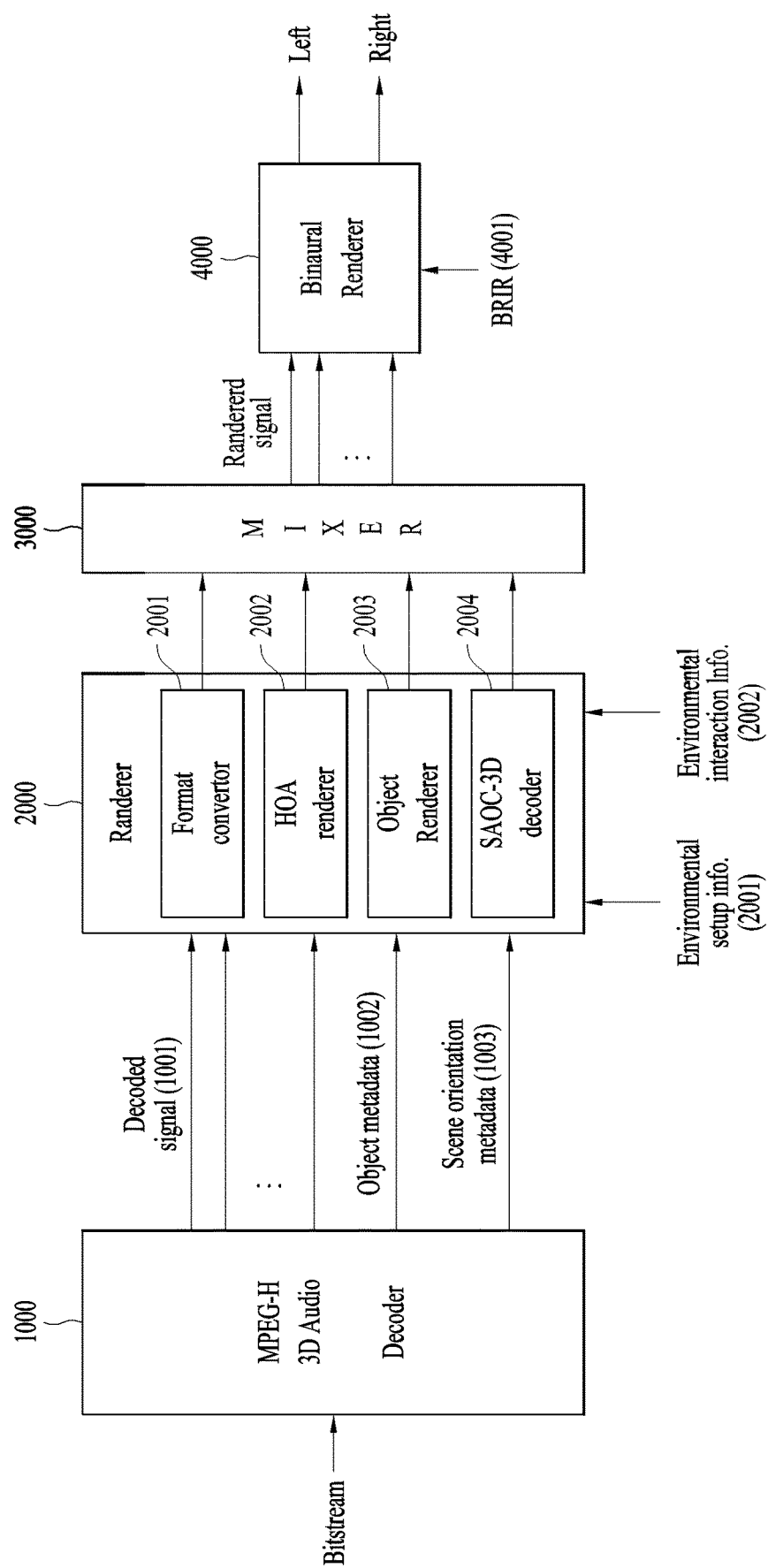
FIG. 7 is a block diagram of an audio output apparatus according to another embodiment of the present disclosure.

FIG. 7 is a block diagram of an audio output apparatus according to another embodiment of the present disclosure. An MPEG-H 3D Audio decoder 1000 is applied to the audio output apparatus, by way of example. A bitstream including an audio signal 1001 input to the audio output apparatus is decoded according to the characteristics of the audio signal 1001 (e.g., channel, object, Spatial Audio Object Coding (SAOC), and HOA) through the MPEG-H 3D Audio decoder 1000. Further, the MPEG-H 3D Audio decoder 1000 decodes object metadata 1002 and the afore-described scene orientation information 1003.

Further, a render 2000 receives environment setup information 2001 and element interaction information 2002 from the outside, and renders the decoded audio signal 1001 using the environment setup information 2001 and the element interaction information 2002 along with the object metadata 1002 and the scene orientation information 1003.

For example, if the audio characteristics match a channel signal, the renderer 2000 may be a format converter 2001. If the audio characteristics match an HOA signal, the rendered 2000 may be an HOA renderer 2002. If the audio characteristics match an object signal, the rendered 2000 may be an object renderer 2003. If the audio characteristics match an SAOC transport channel, the rendered 2000 may be an SAOC 3D decoder 2004. Then, a final rendered signal is output through a mixer 3000. In the case of a VR environment, a sense of 3D sound space should be provided through a 2-channel speaker such as a headphone or an earphone. Therefore, after an output signal is filtered using a BRIR 4001 in a binaural renderer 4000, a left/right audio signal having a 3D surround effect is output.

As is apparent from the foregoing description, the method and apparatus for outputting an audio signal according to embodiments of the present disclosure have the following effects.

First, since audio interaction is possible in video scene switching, a more real audio may be provided.

Secondly, the implementation efficiency of MPEG-H 3D Audio may be increased by a future-generation immersive 3D audio coding technique. That is, as a compatible syntax is additionally provided to the existing MPEG-H 3D Audio standard under development, a user may enjoy an audio with a continuous sense of immersion even during video scene switching such as random access.

Thirdly, a natural, realistic effect may be provided in correspondence with a frequently changed video scene in various audio application fields such as gaming or a VR space.

The foregoing embodiments of the present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include an audio decoder, a metadata processor, a renderer, and a binaural renderer as whole or partial components.

The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method for decoding an audio bitstream by a decoding apparatus, the method comprising:
    obtaining extension element configuration information from the audio bitstream;
    based on the extension element configuration information indicating that scene orientation information is present in the audio bitstream, obtaining a decoded audio signal, object metadata, and the scene orientation information from the audio bitstream;
    receiving external control information, and generating modified object metadata by modifying the object metadata based on the received external control information;
    rendering the decoded audio signal using the modified object metadata; and
    modifying the rendered audio signal based on the scene orientation information,
    wherein the scene orientation information is information indicating a camera capture direction during generation of a video scene associated with the decoded audio signal.

2. The method according to claim 1, wherein the scene orientation information is used for execution of a random access function for the video scene associated with the decoded audio signal.

3. The method according to claim 1, wherein the scene orientation information includes yaw information, pitch information, and roll information,
    the yaw information indicating an angle of rotating the camera capture direction in a z-axis,
    the pitch information indicating an angle of rotating the camera capture direction in an x-axis, and
    the roll information indicating an angle of rotating the camera capture direction in a y-axis.

4. The method according to claim 1, wherein the modified object metadata includes a relative position of an audio object and a gain in a space corresponding to a user location.

5. The method according to claim 1, further comprising performing binaural rendering on the rendered audio signal, using a Binaural Room Impulse Response (BRIR) to output the rendered audio signal as a 2-channel surround audio signal.

6. An apparatus for decoding an audio bitstream, the apparatus comprising:
    an audio decoder configured to obtain extension element configuration information from the audio bitstream, and
    based on the extension element configuration information indicating that scene orientation information is present in the audio bitstream, obtain a decoded audio signal, object metadata, and the scene orientation information from the audio bitstream;
    a metadata processor configured to receive external control information, and generate modified object metadata by modifying the object metadata based on the received external control information; and a renderer configured to render the decoded audio signal using the modified object metadata, wherein the renderer modifies the rendered audio signal based on the scene orientation information, and wherein the scene orientation information is information indicating a camera capture direction during generation of a video scene associated with the decoded audio signal.

7. The apparatus according to claim 6, wherein the scene orientation information is used for execution of a random access function for the video scene associated with the decoded audio signal.

8. The apparatus according to claim 6, wherein the scene orientation information includes yaw information, pitch information, and roll information, the yaw information indicating an angle of rotating the camera capture direction in a z-axis, the pitch information indicating an angle of rotating the camera capture direction in an x-axis, and the roll information indicating an angle of rotating the camera capture direction in a y-axis.

9. The apparatus according to claim 6, wherein the modified object metadata includes a relative position of an audio object and a gain in a space corresponding to a user location.

10. The apparatus according to claim 6, further comprising a binaural renderer configured to perform binaural rendering on the rendered audio signal, using a Binaural Room Impulse Response (BRIR) to output the rendered audio signal as a 2-channel surround audio signal.

* * * * *